Patented Oct. 22, 1929

1,732,398

UNITED STATES PATENT OFFICE

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK

CORK COMPOSITION

No Drawing. Application filed July 9, 1924. Serial No. 724,950.

This invention relates to cork compositions, and a method for producing the same.

A cork composition is usually considered of a good grade when it has a resemblance to natural cork and is uniform in structure. It should have other desirable characteristics, however, and these characteristics may change, depending upon the use to which it is to be put. A cork composition to be used as a friction surface should have a high frictional value and the individual granules should be so arranged, and held together so tenaciously that repeated jars and all-around rough treatment will not break them apart. A cork composition to be used in a place where it will come in contact with water or be exposed to a high humidity should be preferably waterproof because if the granules become moist and swell, a disruption and disintegration of the structure will result. If the binder of a cork composition is water soluble or appreciably softened by water, disintegration will result from the action of the water directly upon the binding agent.

Cork compositions are used in a variety of ways and for a great many different purposes and a cork composition to be used for a particular purpose should have whatever characteristics are requisite for its use in that connection. For instance, a cork composition to be used for friction drive rolls, such as those described in Patent 1,123,696, issued to E. B. Craft and J. N. Reynolds may be considered. Should these rolls be made from a cork composition having a water soluble binder they would shrink very greatly on drying. For this reason when a water soluble binder is employed such rolls cannot be molded into shape because the shrinkage cannot be allowed for with sufficient accuracy. The method occasionally employed in fabricating these rolls is to mold the cork to a larger size than is required, allow the composition to dry, mount the pieces upon a shaft and then turn them down so as to form rolls of the proper shape and size. Besides the added cost of this operation the granules of a composition so formed may not have the proper "lay" to impart the best frictional qualities to the surface.

As indicated above cork compositions have been formed having many different materials as binders. Each of these compositions has its own characteristics which make it desirable for some purposes and undesirable for others. No cork composition has been made which admits of universal use as a substitute for natural cork and the number of applications to which a particular cork composition is adapted is limited.

One object of the present invention is to produce an improved cork composition capable of more universal use.

Another object of the invention is to produce a cork composition friction member having improved frictional characteristics and capable of being manufactured more quickly and economically.

Still another object of the invention is to produce a water and oil resistant cork composition.

A further object of the invention is to provide a method for producing a cork composition having the characteristics above noted, a feature of the method being that in practicing the same, the properties of the cork composition can be readily controlled.

In one embodiment of the invention granules of cork are coated with a binder so as to avoid impregnation thereof. The binder comprises a phenolic resin and is rendered infusible and insoluble by heat and pressure to form a composite article.

Other objects and features of the invention will appear from the following description, and will be particularly pointed out in the appended claims.

A cork composition having a binder of synthetic resins and fabricated in a manner which will be hereinafter explained possesses to a marked degree the characteristics which are desired in composition corks in general and which are particularly desirable where the cork is to be used for frictional purposes. A cured resin binder is desirable because it is both infusible and insoluble and the only shrinkage which takes place in the molding is that due to cooling. Such a composition can be molded to form; the amount of shrinkage taking place being small and definitely determinable, can be allowed for. In order to secure the most desirable frictional properties, the composition is molded preferably in the following manner.

A number of segments are assembled upon a shaft to form a friction drive roll which may be used for the purpose of driving selector brushes of the type described and in the manner described in Patent 1,123,696, issued to E. B. Craft and J. N. Reynolds. A friction drive roll made up in this manner has better frictional qualities than rolls heretofore produced. It is believed that the "lay" of the cork granules causes a better gripping action than would be obtained if these granules were compressed uniformly in all directions. It is apparent, however, that a roll produced in this manner is more durable when subjected to rough usage such as when used for friction drive purposes. The individual cork granules being disk-like in shape and being exposed only on one edge are not as easily dislodged and broken away from the composition as when the granules are substantially round, and a relatively large proportion of the surface is subjected to frictional action.

In order to secure the best qualities from a composition cork, it is desirable that only the surface of the granules be coated with the binder, because if the entire cork granule is impregnated with the binder the composition loses the resiliency and other properties of natural cork.

We have determined that it is possible to coat the surface of cork granules and at the same time avoid impregnation. Various methods may be employed for accomplishing this result, but a process which has given uniformly good results is as follows:

The cork granules are first entirely freed from foreign matter, such as dust and the like, and are then dampened with a substantially non-aqueous liquid, preferably a volatile solvent of the resin binder. The cork granules are then rapidly agitated and the binder in suitable quantities in the form of a powder is introduced. The granules being moistened by the non-aqueous liquid the binder will adhere to the surface and the coating of the entire surface of each one of the granules is simply a matter of proper agitation, for a sufficient time to permit the thorough distribution of all of the contents. As soon as the cork granules are properly coated, they are removed from the container and spread out to dry so that substantially all traces of the volatile liquid are removed. The drying step of the process may be accelerated by means of a vacuum alone, or by mild heating in the presence of a vacuum.

In carrying out the invention, using synthetic resin as a binder, the following process may be employed: Granulated cork 100 grams is mixed with alcohol 30 c. c. in which 0.3 of a gram of castor oil has been dissolved. As soon as this is properly mixed together so that the liquid is uniformly distributed, 15 grams of synthetic resin powder containing such resin as may be transformed to an infusible, insoluble compound by heat and pressure, are added while the moist cork is being agitated. It is preferred that the type of synthetic resin employed should be both fusible and soluble, but be capable of being rendered both infusible and insoluble by heat and pressure. A synthetic resinous binder adapted for use in the molding of a composition cork may be a product of the condensation of a phenolic body with an active methylene compound, into which hexamethylene-tetramine is introduced as a hardening agent.

As soon as a uniform mixture is obtained the cork granules are spread out to dry and when dry may be used for molding in the manner described above.

Although the process for coating granules of cellular material preparatory to molding as described above, is the preferred form of this step of the process, good results may be obtained in other ways. For instance, the dry resin powder and dry granulated cork may be mixed together and agitated in a rapidly revolving drum. While the drum is being agitated a solvent for the resin may be sprayed onto the mass causing a gradual adhesion to the cork granules of the resin particles which have become sufficiently softened by the solvent to become tacky. Or, as an alternative, the synthetic resin may be dissolved in alcohol and the solution sprayed upon a mass of granulated cork while the latter is being agitated. When this method is employed the alcohol evaporates practically while being sprayed so that the film which is deposited upon the cork granules is of such a consistency and sufficiently dry so that the impregnation of the granules is avoided. Again, the cellular particles may be moistened with a non-aqueous liquid which is not a solvent for the binder. The synthetic resin or other binder may then be dissolved and the solution sprayed onto the cellular granules while they are being rapidly agitated. The effect is to cause a precipitation of the binder when it comes in contact with the non-solvent liquid on the cellular particles.

By the use of the method described above, particularly in the preferred form, the quality of the composition cork can be controlled by controlling not only the amount of the binder but the degree of compression of the mass. For instance, in the preferred method described above, to use a greater amount of binder, a larger amount of alcohol may be employed, a greater amount of solvent being desirable if the added resin is to adhere satisfactorily.

A cork composition produced in the manner herein described may be substantially as resilient as natural cork because since no binder penetrates the interior of the granules, the cork is retained in substantially its natural state. The amount of binder may be cut down so that a very fine film only, exists between the granules.

What is claimed is:

1. As a new article of manufacture, a molding composition comprising granulated cork, phenolic resin, hexamethylenetetramine and castor oil.

2. A method for producing a molding composition of a cellular material and phenolic binder which comprises moistening said cellular material with a mixture of castor oil and alcohol, and mixing therewith a synthetic resinous binder.

3. A method for producing a cork composition which comprises moistening the cork granules with a mixture of castor oil and alcohol and then mixing therewith a synthetic resinous binder.

4. A method of producing a molding composition of cork particles and resinous binder, which comprises mixing approximately 100 grams of cellular cork material and 30 c. c. of a volatile organic solvent, and adding thereto approximately 15 grams of a resinous binder.

5. A method for coating cork granules, which consists in subjecting the granules to a solution of alcohol and an oil, and then adding a binder which is soluble in the alcohol.

6. A method for coating cork granules, which consists in subjecting the granules to a solution of alcohol and castor oil, and then adding a resinous binder which is soluble in the alcohol.

7. A method for coating the surface of cork granules with a binder in such a manner as to avoid interior impregnation, which consists in moistening the cork granules with a solvent for a binder, and then forming a contact between the moistened cork particles and the binder in finely divided state.

8. A method for producing a composition of cellular material which consists in treating cork granules with a liquid solvent to avoid impregnation, mixing the thus treated granules with a soluble, fusible binder, and then reducing the binder to an insoluble, infusible state.

9. A method for producing a composition of cellular material which consists in treating cork granules with a liquid solvent to avoid impregnation, mixing the thus treated granules with a soluble, fusible binder, and then reducing the binder to an insoluble, infusible state by heat and pressure.

10. A circular friction drive member comprising cork particles, and a phenolic condensation product substantially enveloping each individual particle remaining solely on the surface thereof and acting as an adhesive for the particles.

11. A method of producing a highly resilient and elastic friction member comprising treating cork particles with a solvent, mixing therewith a binder to provide a thin surface layer on the particles, and then rendering the binder infusible and insoluble.

12. A method of producing a highly resilient and elastic friction member comprising treating cork particles with a solvent, mixing therewith a binder including a hardening agent to provide a thin surface layer on the particles, and then rendering the binder infusible and insoluble.

13. A method of producing a highly resilient and elastic friction member comprising treating cork particles with a solvent, mixing therewith a binder in a powdered state to provide a thin surface layer on the particles, and then rendering the binder infusible and insoluble by the application of heat and pressure.

In witness whereof, we hereunto subscribe our names this 28th day of June A. D., 1924.

ELMER ANSON DANIELS.
HARRY STIRLING SNELL.